US010239065B2

(12) United States Patent
Huang et al.

(10) Patent No.: US 10,239,065 B2
(45) Date of Patent: Mar. 26, 2019

(54) FLOW CONTROL COMPONENT AND SHOWER

(71) Applicant: KYLIN SANITARY TECHNOLOGY (XIAMEN) CO., LTD., Xiamen (CN)

(72) Inventors: Hui Huang, Xiamen (CN); Qingshuang Li, Xiamen (CN); Xi-Jie Deng, Xiamen (CN)

(73) Assignee: KYLIN SANITARY TECHNOLOGY (XIAMEN) CO., LTD., Xiamen, Fujian Province (CN)

( * ) Notice: Subject to any disclaimer, the term of this patent is extended or adjusted under 35 U.S.C. 154(b) by 24 days.

(21) Appl. No.: 15/661,913

(22) Filed: Jul. 27, 2017

(65) Prior Publication Data

US 2019/0001350 A1  Jan. 3, 2019

(30) Foreign Application Priority Data

Jun. 28, 2017  (CN) .......................... 2017 1 0505405

(51) Int. Cl.
*F16K 37/00*  (2006.01)
*B05B 1/18*  (2006.01)
*B05B 1/30*  (2006.01)
*E03C 1/04*  (2006.01)
(Continued)

(52) U.S. Cl.
CPC ............ *B05B 1/185* (2013.01); *B05B 1/3026* (2013.01); *E03C 1/0408* (2013.01); *F16K 3/262* (2013.01); *F16K 37/0058* (2013.01); *E03C 2001/026* (2013.01)

(58) Field of Classification Search
CPC ......... B05B 1/185; B05B 1/30; B05B 1/3026; F16K 5/04; F16K 5/0407; F16K 5/0421; F16K 27/065; F16K 31/5286; F16K 31/445
USPC ..... 239/443, 448, 569, 581.1, 445; 251/206, 251/207, 209
See application file for complete search history.

(56) References Cited

U.S. PATENT DOCUMENTS 189,328 A * 4/1877 Stump .................. B05B 1/3026
239/538
210,941 A * 12/1878 Harrigan ............... B05B 1/3026
239/579
(Continued)

FOREIGN PATENT DOCUMENTS

CN            205361740 U     7/2016

*Primary Examiner* — Viet Le
(74) *Attorney, Agent, or Firm* — Muncy, Geissler, Olds & Lowe, P.C.

(57) ABSTRACT

A flow control component comprises a water inlet pipe, and a shower equipped with the flow control component. A partition formed with water holes which are different in aperture is disposed in the middle of the water inlet pipe; a first rotating block with a water diversion opening and a main water opening respectively formed at two ends is installed in an inner hole of the water inlet pipe; a first water passage which communicates with the water diversion opening and the main water opening is disposed in the middle of the first rotating block. The water inlet pipe is externally sleeved with an adjusting sleeve; a toggle pin passes through a radial arc-shaped hole on an outside face of the water inlet pipe; the adjusting sleeves drives the first rotating block to rotate through the toggle pin such that the water diversion opening selectively communicates with the water holes.

10 Claims, 14 Drawing Sheets

(51) Int. Cl.
*F16K 3/26* (2006.01)
*E03C 1/02* (2006.01)

(56) References Cited

U.S. PATENT DOCUMENTS

| | | | | |
|---|---|---|---|---|
| 336,602 A * | 2/1886 | Tomlinson | | B05B 1/308 239/448 |
| 370,836 A * | 10/1887 | Wilkins | | B05B 1/308 239/448 |
| 618,412 A * | 1/1899 | Haas et al. | | B05B 1/1609 239/441 |
| 626,596 A * | 6/1899 | Crane | | B05B 1/1609 137/625.47 |
| 694,365 A * | 3/1902 | Garrison | | B05B 1/308 239/448 |
| 968,462 A * | 8/1910 | Glazier | | B05B 1/3026 137/625.21 |
| 1,310,964 A * | 7/1919 | Piat | | B05B 1/3026 239/538 |
| 2,190,356 A * | 2/1940 | Fausek | | F23D 14/465 239/415 |
| 2,755,136 A * | 7/1956 | Lum | | A62C 31/03 251/310 |
| 3,033,226 A * | 5/1962 | Allen | | F16K 5/0421 137/315.07 |
| 3,126,132 A * | 3/1964 | Lyon et al. | | B65D 83/207 137/625.46 |
| 3,219,278 A * | 11/1965 | Santarelli | | B05B 1/3026 239/541 |
| 3,341,168 A * | 9/1967 | Toeppen | | B05B 15/658 251/148 |
| 3,358,934 A * | 12/1967 | Moen | | E03C 1/084 239/428.5 |
| 3,465,820 A * | 9/1969 | Kisling | | E21B 23/006 166/124 |
| 3,995,664 A * | 12/1976 | Nelson | | A01G 25/023 138/36 |
| 4,190,207 A * | 2/1980 | Fienhold | | B05B 1/18 239/381 |
| 4,807,850 A * | 2/1989 | Robinson | | F23K 5/147 137/551 |
| 5,862,985 A * | 1/1999 | Neibrook | | B05B 1/1636 239/428.5 |
| 5,954,093 A * | 9/1999 | Leonard | | F15B 13/0406 137/624.13 |
| 6,026,854 A * | 2/2000 | Davidson | | G05D 16/103 137/547 |
| 6,126,091 A * | 10/2000 | Heitzman | | B05B 1/1636 239/380 |
| 6,527,204 B2 * | 3/2003 | Heitzman | | B05B 1/1636 239/225.1 |
| 6,539,899 B1 * | 4/2003 | Piccirilli | | F01P 7/167 123/41.08 |
| 7,100,845 B1 * | 9/2006 | Hsieh | | B05B 1/1627 239/444 |
| 7,494,074 B2 * | 2/2009 | Benstead | | B05B 1/1618 239/11 |
| 7,641,470 B2 * | 1/2010 | Albizuri | | F16K 5/0214 126/39 E |
| 7,871,020 B2 * | 1/2011 | Nelson | | E03C 1/0404 137/801 |
| 8,297,538 B2 * | 10/2012 | Zhou | | B05B 1/1636 239/391 |
| 8,434,512 B2 * | 5/2013 | Bergmann | | F16K 11/074 137/625 |
| 8,783,288 B2 * | 7/2014 | Lin | | B05B 1/3013 137/597 |
| 9,168,550 B1 * | 10/2015 | Soto | | B05B 1/3026 |
| 9,347,208 B2 * | 5/2016 | Quinn | | E03C 1/0412 |
| 9,573,142 B2 * | 2/2017 | Zhou | | B05B 1/1636 |
| 9,839,927 B2 * | 12/2017 | Spang | | B05B 1/12 |
| 2002/0175223 A1 * | 11/2002 | Chih | | B05B 1/3026 239/310 |
| 2004/0079916 A1 * | 4/2004 | Brice | | F16K 3/0209 251/206 |
| 2005/0104024 A1 * | 5/2005 | Oliver | | F16K 3/085 251/206 |
| 2005/0258274 A1 * | 11/2005 | Wang | | B05B 1/1636 239/393 |
| 2008/0121293 A1 * | 5/2008 | Leber | | B05B 1/1636 137/597 |
| 2009/0194613 A1 * | 8/2009 | Mang | | B05B 1/18 239/562 |
| 2010/0320295 A1 * | 12/2010 | Mang | | B05B 1/18 239/562 |
| 2011/0024525 A1 * | 2/2011 | Yu | | B05B 1/3026 239/318 |
| 2011/0287170 A1 * | 11/2011 | Colclough, Jr. | | B05B 7/149 427/2.31 |
| 2012/0097766 A1 * | 4/2012 | Lin | | B05B 1/3013 239/446 |
| 2012/0181356 A1 * | 7/2012 | Miller | | B05B 1/185 239/548 |
| 2012/0187320 A1 * | 7/2012 | Lu | | A01G 25/00 251/304 |
| 2012/0241539 A1 * | 9/2012 | Wang | | B05B 1/3026 239/233 |
| 2013/0015270 A1 * | 1/2013 | Lai | | B05B 9/01 239/526 |
| 2014/0042250 A1 * | 2/2014 | Maksymec | | B05B 15/70 239/569 |
| 2014/0263745 A1 * | 9/2014 | Chen | | B05B 1/3026 239/393 |
| 2014/0291419 A1 * | 10/2014 | Pitsch | | B05B 1/169 239/437 |
| 2015/0060569 A1 * | 3/2015 | Yu | | B05B 9/01 239/393 |
| 2015/0102125 A1 * | 4/2015 | Sesser | | B05B 1/1636 239/113 |
| 2016/0016188 A1 * | 1/2016 | Spang | | B05B 1/12 222/153.13 |
| 2016/0243563 A1 * | 8/2016 | Maksymec | | B05B 15/70 |
| 2016/0250651 A1 * | 9/2016 | Ayers | | B05B 1/12 239/391 |
| 2016/0286984 A1 * | 10/2016 | Gschwind | | A47F 3/001 |
| 2017/0204978 A1 * | 7/2017 | Huang | | F16K 5/0407 |
| 2017/0216854 A1 * | 8/2017 | Thurgood | | A01K 13/001 |
| 2017/0252755 A1 * | 9/2017 | Pitsch | | B05B 1/169 |
| 2017/0328506 A1 * | 11/2017 | Chang | | F16L 37/38 |
| 2017/0333924 A1 * | 11/2017 | Sesser | | B05B 3/005 |
| 2017/0361141 A1 * | 12/2017 | Kim | | F16K 5/0647 |
| 2017/0367275 A1 * | 12/2017 | Wang | | B05B 1/3026 |
| 2018/0065131 A1 * | 3/2018 | Rogers | | B05B 1/1627 |
| 2018/0065132 A1 * | 3/2018 | Spang, Jr. | | B05B 15/656 |

* cited by examiner

FLOW CONTROL COMPONENT AND SHOWER

BACKGROUND OF THE INVENTION

Technical Field

The present invention relates to the technical field of the manufacturing of bathroom equipment, in particular a flow control component and a shower.

Description of Related Art

In the technical field of the manufacturing of bathroom equipment, common water sprayers such as showers have water outflow usually directly controlled by a water mixing switch. However, it is relatively inconvenient to regulate the water outflow of the shower through the water mixing switch. In order to solve the problem of the relatively inconvenient control of the shower flow, flow control devices which can be directly installed on the showers have been designed, for example, the Chinese patent with a patent number of ZL201521123106.7 and a patent name of "Flow Control Mechanism for Hand-Held Showers" disclosed on Jul. 6, 2016. The flow control mechanism for a hand-held shower adopts the following technical solution: a gripping portion of the hand-held shower is internally provided with a valve core which has a water inflow passage; the flow control mechanism is disposed on the gripping portion and on the water inflow passage of the valve core, and comprises a valve shaft, a shaft rod and a knob; an opening which communicates with the water inflow passage is formed on a lateral wall of the valve core; the gripping portion is formed with a gap at a position corresponding to the opening of the valve core; the valve shaft is disposed in the opening of the valve core; the upper part of the valve shaft has a guide slot which is formed in an inclined way; below the guide slot, the valve shaft is provided with a loop-like water port formed by the indentation of the valve shaft; the shaft rod is disposed in the guide slot of the valve shaft and is movably fixed at the bottom of the knob; the valve shaft and the knob are connected through the shaft rod; and the knob is greater than the gap of the gripping portion and is disposed on the gap. Such flow control mechanism can be operated with a single hand to control the water outflow of the shower, but the structure and manufacturing are both complicated.

BRIEF SUMMARY OF THE INVENTION

The technical problem to be solved in the present invention is to provide a flow control component which can conveniently control the water flow of the water inlet pipe and can be conveniently applied to hand-held showers.

To achieve the above objective, the present invention adopts the following technical solution. A flow control component includes a water inlet pipe. A partition is disposed in the middle of the water inlet pipe; the partition is formed with a plurality of water holes which are different in aperture; a first rotating block is installed in an inner hole of the water inlet pipe; a first water passage is disposed in the middle of the first rotating block; the first rotating block is formed with a water diversion opening on the end face of one end and a main water opening on the end face of the other end; the water diversion opening and the main water opening communicate with each other through a first water passage; the water diversion opening of the first rotating block is eccentrically disposed on the end face of the first rotating block, and the water diversion opening of the first rotating block is disposed close to the partition. The water inlet pipe is externally sleeved with an adjusting sleeve; a radial arc-shaped hole is formed on an outside face of the water inlet pipe; a toggle pin passes through the arc-shaped hole and has one end connected with the first rotating block and the other end connected with the adjusting sleeve; the adjusting sleeve drives the first rotating block to rotate through the toggle pin such that the water diversion opening of the first rotating block communicates with one of the water holes or communicates with more than one of the water holes or avoids communication with all the water holes.

As a further improvement, a toggle groove is formed on the inside face of the adjusting sleeve; one end of the toggle pin is inserted in the first rotating block and the other end is clamped on the toggle groove; and at least one sealing ring is disposed between the first rotating block and the inside face of the water inlet pipe. Thus, the installation is convenient, and the sealing performance is enhanced.

As a further improvement, a first positioning mechanism is also disposed between the water inlet pipe and the adjusting sleeve; the first positioning mechanism consists of a first radial concave hole which is formed on the outside face of the water inlet pipe, and a first pressure spring and a first positioning column which are installed in the first radial concave hole in turn from the inside to the outside; a plurality of first positioning grooves are formed on the inner circumferential face of the adjusting sleeve; and as the adjusting sleeve rotates, the first positioning column is respectively matched with different first positioning grooves. Through the first positioning mechanism, the relative positions of the first rotating block and the water inlet pipe can be relatively conveniently confirmed.

As a further improvement, the water inlet pipe is also externally sleeved with a display ring and a housing; the display ring is provided with a plurality of indicating marks; the housing is provided with a display window; parts of the display ring with the indicating marks extend into the housing; and the adjusting sleeve is detachably fixedly connected to the display ring or the adjusting sleeve is integrally connected with the display ring; the adjusting sleeve drives the display ring to rotate; and the plurality of indicating marks can appear on the display window in turn. Thus, the water inflow of the water inlet pipe can be visually observed.

The flow control component drives the first rotating block to rotate by toggling the adjusting sleeve, and then the water diversion opening of the first rotating block can communicate with one of the water holes or communicate with more than one of the water holes or avoid connection with all water holes. Thus, the water flow of the water inlet pipe can be conveniently controlled. The flow control component has a relatively simple structure, and the flow control component can be directly installed on the water inlet pipe, so the flow control component can be conveniently applied to hand-held showers.

Another technical solution solved by the present invention is to provide a shower which can conveniently adjust the water outflow and has an excellent water-saving effect.

In order to achieve the above objective, the present invention adopts the following technical solution. A shower includes a housing with a hand-held portion; the housing is equipped with a water outflow component at one end; the water outflow component is provided with a plurality of water outflow passages; the housing is equipped with a flow control component, and the water inlet pipe of the flow control component communicates with the water outflow passages on the water outflow component through a water switching valve which is installed on the housing.

Preferably, the water switching valve consists of a valve body and a second rotating block; the valve body has a cavity; a plurality of water discharge holes are formed at the bottom of the cavity; each one of the water discharge holes communicates with one of the water outflow passages on the water outflow component.

One end of the second rotating block is inserted in the cavity; the other end of the second rotating block is inserted in the water inlet pipe on the flow control component; a second water passage is formed in the middle of the second rotating block; the end face of one end, inserted in the cavity, of the second rotating block is embedded with a sealing plug and formed with an eccentric water outlet; the end face of other end, which is inserted in the water inlet, of the second rotating block is formed with a water inlet; the water outlet and the water inlet communicate with each other through the second water passage; and the water outlet communicates with the inner hole of the water inlet pipe.

A roller is disposed at the middle portion of the second rotating block; the roller is partly protruded out of the housing; the second rotating block can be driven to rotate by toggling the roller. As the second rotating block rotates, the water outlet at one end of the second rotating block selectively communicates with the water discharge holes on the valve body or avoids communication with all the water discharge holes on the valve body, and the sealing plug selectively seals the water discharge holes on the valve body or avoids sealing the water discharge holes on the valve body.

As a further improvement, a second positioning mechanism is disposed between the second rotating block and the valve body; the second positioning mechanism consists of a second radial concave hole which is disposed on the outer surface of the second rotating block, and a second pressure spring and a second positioning column which are installed in the second radial concave hole in turn from the inside to the outside; a plurality of second positioning grooves are formed on the inner surface of a groove of the valve body; and as the second rotating block rotates, the second positioning column can be respectively matched with different second positioning grooves. Through the second positioning mechanism, the position of the second rotating block can be relatively conveniently confirmed.

As a further improvement, one end of the water inlet pipe close to the second rotating block is clamped with a first U-shaped buckle; the water inlet pipe, together with the housing, forms axial positioning through the first U-shaped buckle; one end of the second rotating block close to the valve body is clamped with a second U-shaped buckle; the second rotating block, together with the valve body, forms axial positioning through the second U-shaped buckle; a sealing ring is disposed between the outside face of the second rotating block and the inside face of the water inlet pipe, and a sealing ring is also disposed between the outside face of the second rotating block and the inside face of the cavity. Thus, the assembling is convenient, and the sealing effect is strengthened.

Preferably, the water outflow component includes a water outflow base and a water outflow board which are mutually connected; the plurality of water outflow passages on the water outflow component are disposed on the water outflow base; the water outflow base is integrally connected with the valve body; the water outflow board is correspondingly formed with groups of blowholes; the water outflow board and the water outflow base are correspondingly formed with groups of blowholes; each group of the blowholes correspond to one of the water outflow passages on the water outflow base; the plurality of outflow passages on the water outflow base respectively communicate with the plurality of water discharge holes on the valve body; and the water outflow board is also sleeved with a surface cover.

As a much further improvement, two sides of the surface cover respectively extend backward to form at least one flange; the at least one flange is formed with plugging holes; two clamping boards which can move toward each other are installed on the back of the water outflow base; each one of the clamping boards is provided with plugging protrusions; when the two clamping boards move away from each other, each one of the plugging protrusions is matched with one of the plugging holes; and when the two clamping boards move toward each other, the plugging protrusions separate from the plugging holes.

The housing is equipped with a button on each one of the two sides of one end where the water outflow component is installed; a reset pressure spring is installed between each one of the clamping boards and the water outflow base; pressing the two buttons drives the two clamping boards to move toward each other; when the two buttons are released, the two clamping boards move away from each other by the effect of the two reset pressure springs; and two guide rails are disposed on the back of the water outflow base to guide the two clamping boards to move toward each other. Thus, the surface cover can be dismantled by pressing the buttons, facilitating cleaning and maintenance.

Due to the flow control component installed on the housing, the shower itself can conveniently adjust the water outflow. The water outflow is conveniently controlled and can be changed as required, thus achieving an excellent water-saving effect.

DETAILED DESCRIPTION OF THE INVENTION

The present invention is described in further detail with reference to the attached drawings and embodiment.

Figure 1:
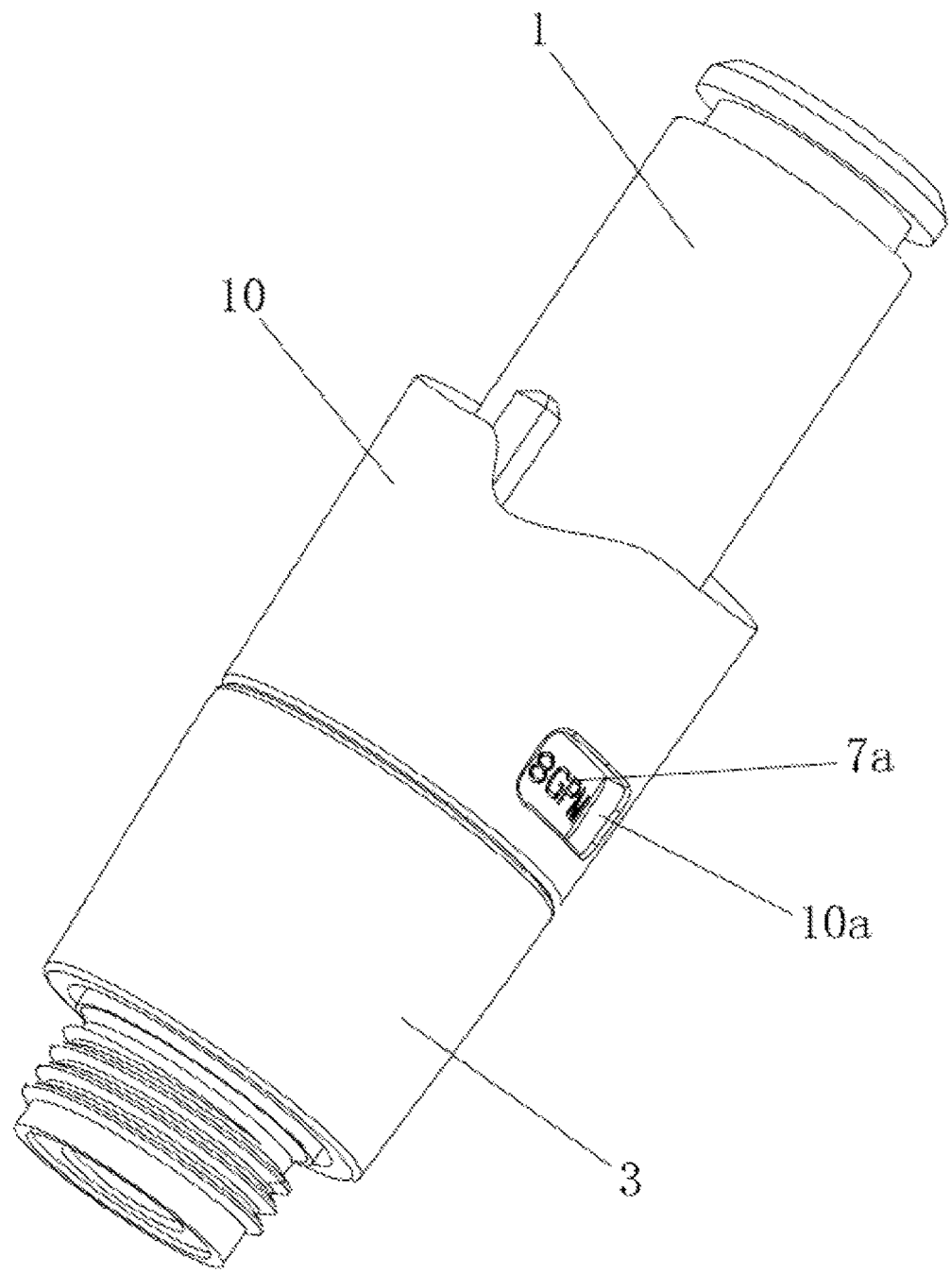
FIG. 1 is a three-dimensional view of a flow control component of the present invention.
Figure 2:
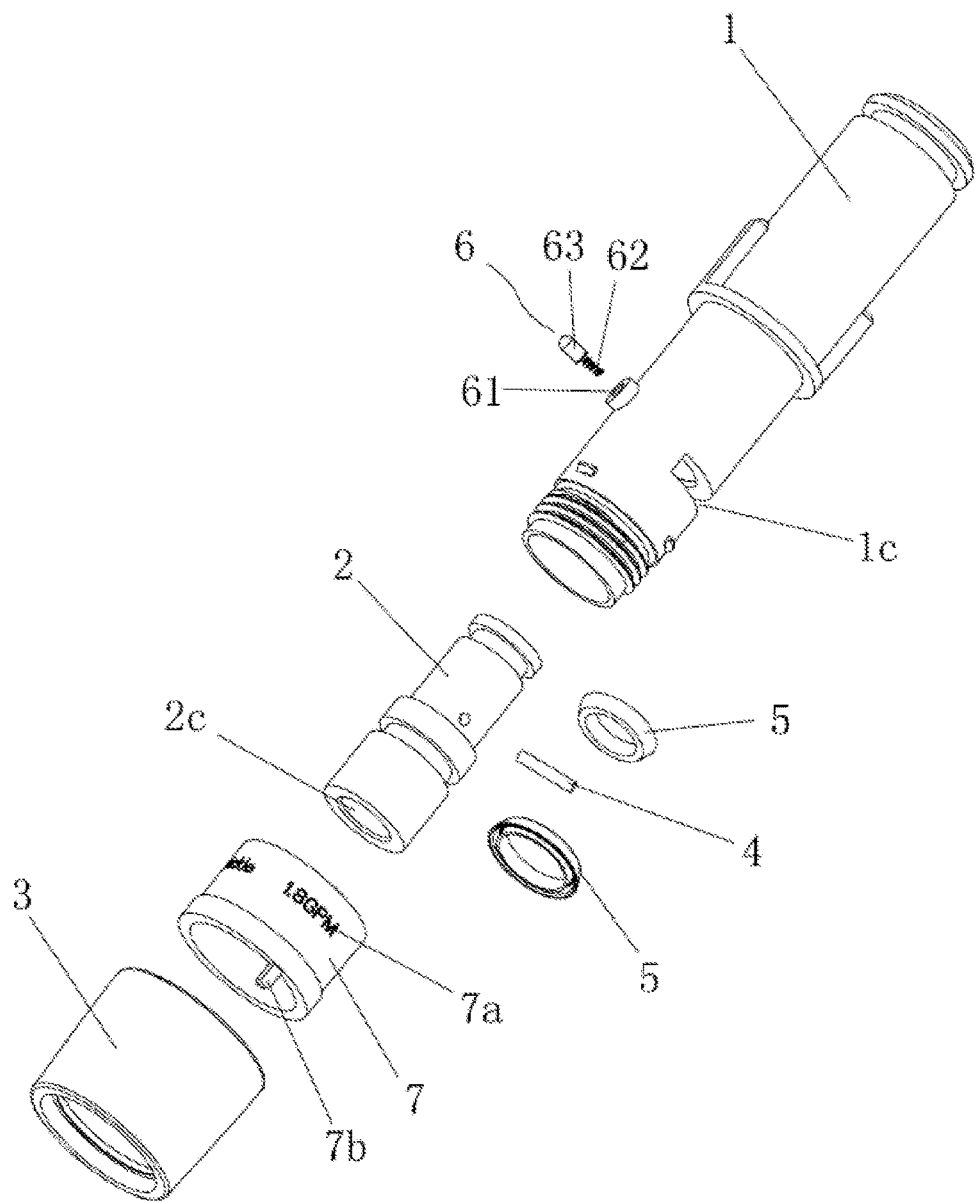
FIG. 2 is a three-dimensional exploded view of FIG. 1 after a housing is hidden.
Figure 3:
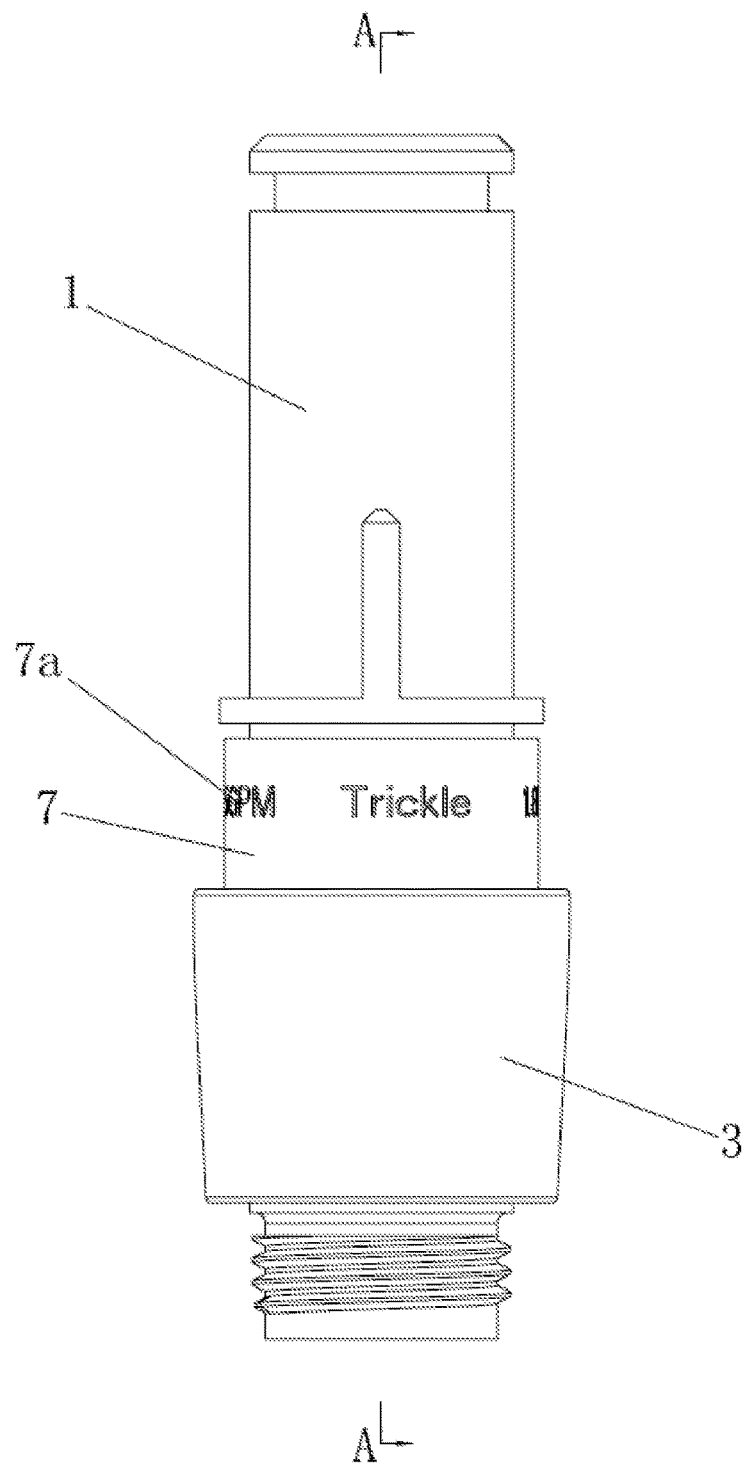
FIG. 3 is a front view of FIG. 1 after the housing is hidden.
Figure 4:
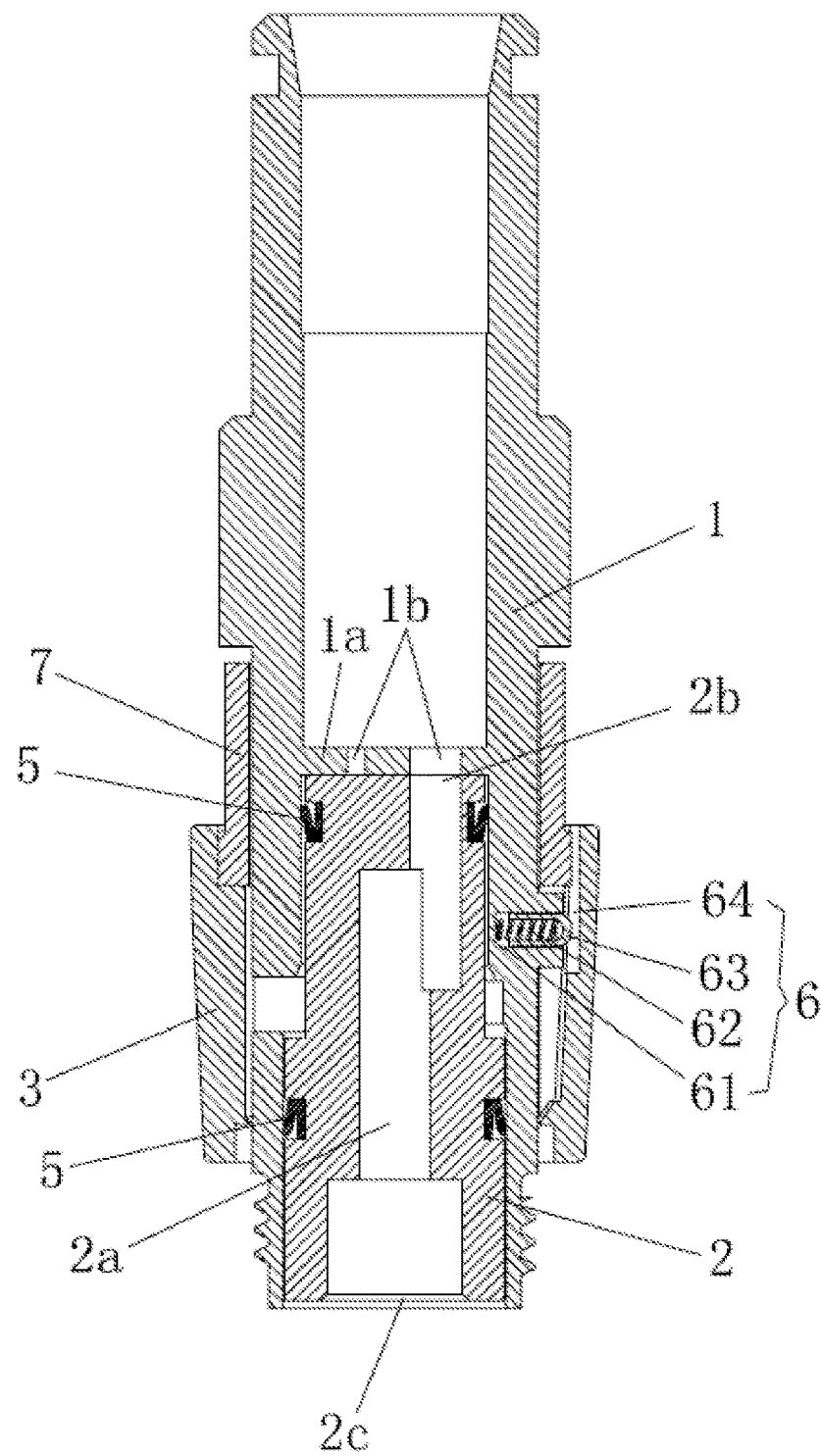
FIG. 4 is a sectional view of FIG. 3 in a direction A-A.
Figure 5:
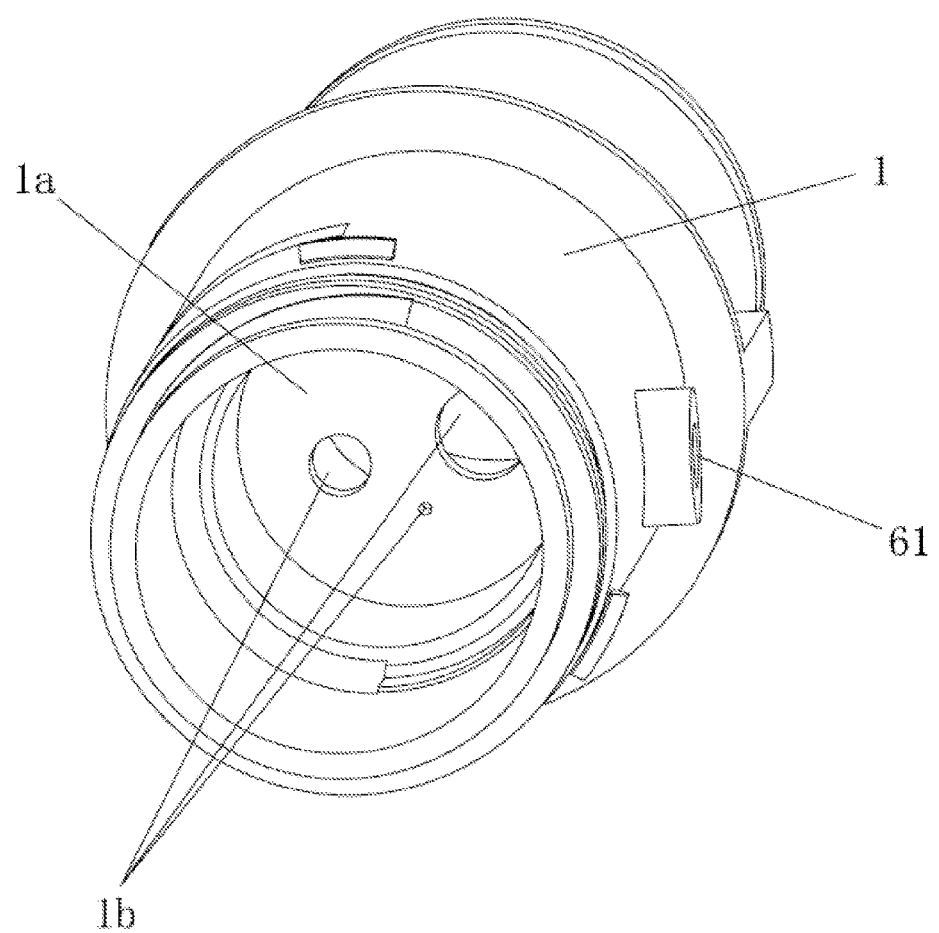
FIG. 5 is a three-dimensional view of a water inlet pipe.
Figure 6:
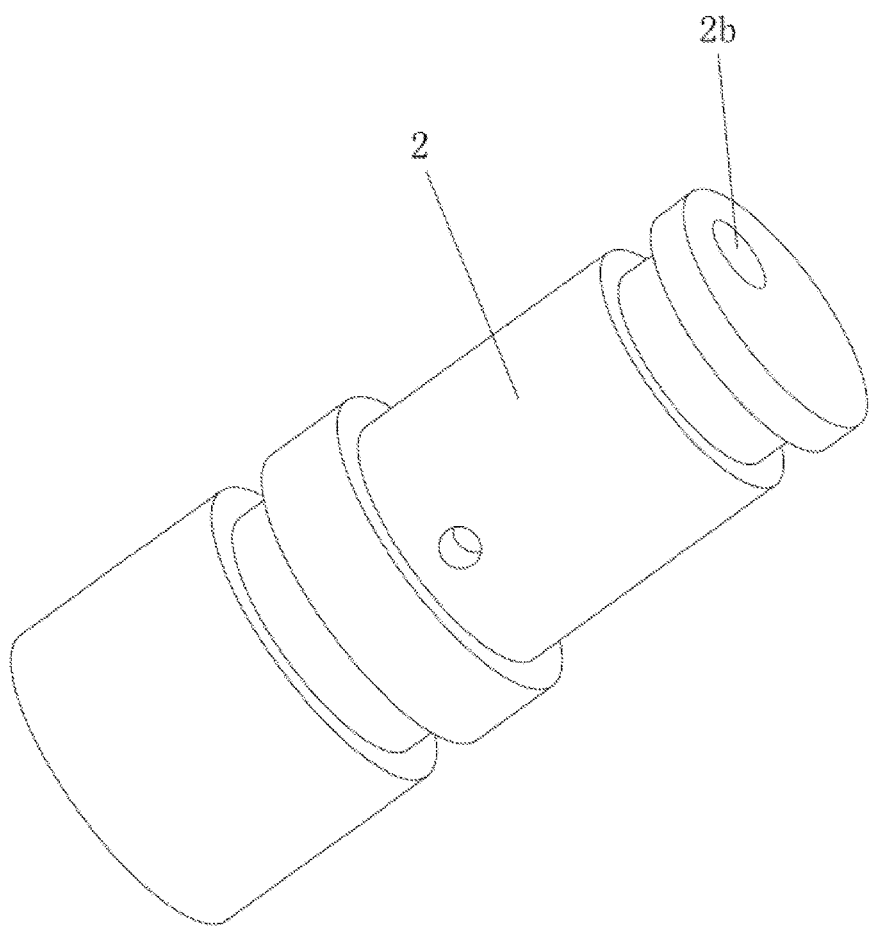
FIG. 6 is a three-dimensional view of a first rotating block.
Figure 7:
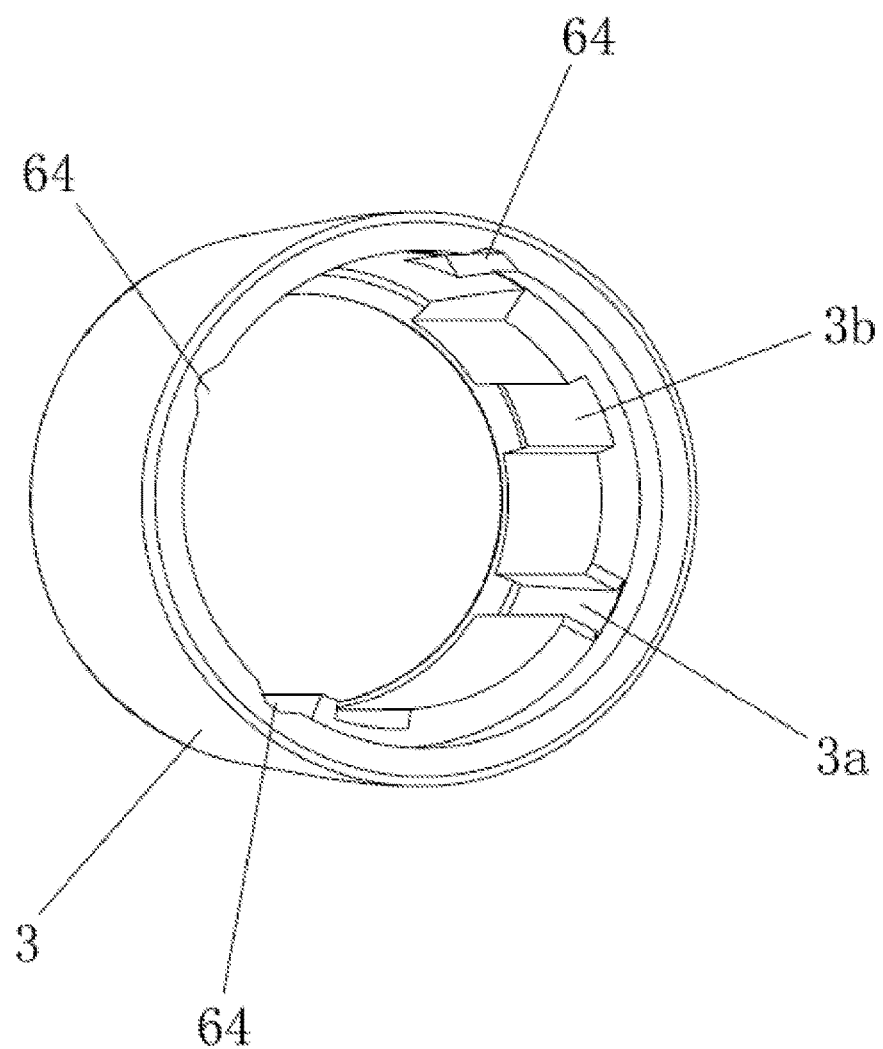
FIG. 7 is a three-dimensional view of an adjusting sleeve.

As shown in FIG. 1-FIG. 7, a flow control component includes a water inlet pipe 1. A partition 1*a* is disposed in the middle of the water inlet pipe 1; the partition 1*a* is formed with three water holes 1*b* which are different in aperture; a first rotating block 2 is installed in an inner hole of the water inlet pipe 1; a first water passage 2*a* is disposed in the middle of the first rotating block 2; the first rotating block 2 is formed with a water diversion opening 2*b* on the end face of one end and a main water opening 2*c* on the end face of the other end; the water diversion opening 2*b* and the main water opening 2*c* communicate with each other through a first water passage 2*a*; the water diversion opening 2*b* of the first rotating block 2 is eccentrically disposed on the end face of the first rotating block 2, and the water diversion opening 2*b* of the first rotating block 2 is disposed close to the partition 1*a*. The water inlet pipe 1 is externally sleeved with an adjusting sleeve 3; a radial arc-shaped hole 1*c* is formed on an outside face of the water inlet pipe 1; a toggle groove 3*a* is formed on an inside face of the adjusting sleeve 3; a toggle pin 4 passes through the arc-shaped hole 1*c* and has one end inserted into the first rotating block 2 and the other end clamped in the toggle groove 3*a* of the adjusting sleeve 3; the adjusting sleeves 3 drives the first rotating block 2 to rotate through the toggle pin 4 such that the water diversion opening 2*b* of the first rotating block 2 communicates with one of the water holes 1*b* or communicates with more than one of the water holes 1*b* or avoids communicate with all the water holes 1*b*.

Two sealing rings 5 are disposed between the outside face of the first rotating block 2 and the inside face of the water inlet pipe 1.

A first positioning mechanism 6 is also disposed between the water inlet pipe 1 and the adjusting sleeve 3; the first positioning mechanism 6 consists of a first radial concave hole 61 which is formed on the outside face of the water inlet pipe 1, and a first pressure spring 62 and a first positioning column 63 which are installed in the first radial concave hole 61 in turn from the inside to the outside; three first positioning grooves 64 are formed on the inner circumferential face of the adjusting sleeve 3; and as the adjusting sleeve 3 rotates, the first positioning column 63 is respectively matched with different first positioning grooves 64.

The water inlet pipe 1 is also externally sleeved with a display ring 7 and a housing 10; the display ring 7 is provided with a plurality of indicating marks 7*a*; the indicating marks 7*a* may be flow indicating marks; the housing 10 is provided with a display window 10*a*; parts of the display ring 7 with the indicating marks 7*a* extend into the housing 10; and the adjusting sleeve 3 is detachably fixedly connected to the display ring 7 or the adjusting sleeve 3 is integrally connected with the display ring 7. In this embodiment, the display ring 7 has one end extending to form a connecting protrusion 7*b*; a mating groove 3*b* is formed on the inside face of the adjusting sleeve 3; the connecting protrusion 7*b* and the mating groove 3*b* are matched such that the adjusting sleeve 3 can drive the display ring 7 to rotate; and when the adjusting sleeve 3 drives the display ring 7 to rotate, the plurality of indicating marks 7*a* can appear on the display window 10*a* in turn. Thus, the water flow of the water inlet pipe 1 can be conveniently observed.

The water inlet pipe 1 is provided with connecting screw threads 1*d* at one end, and the first water passage 2*a* of the first rotating block 2 can also be internally equipped with a flow valve (not shown in the figure) to better control the inflow of water.

Figure 8:
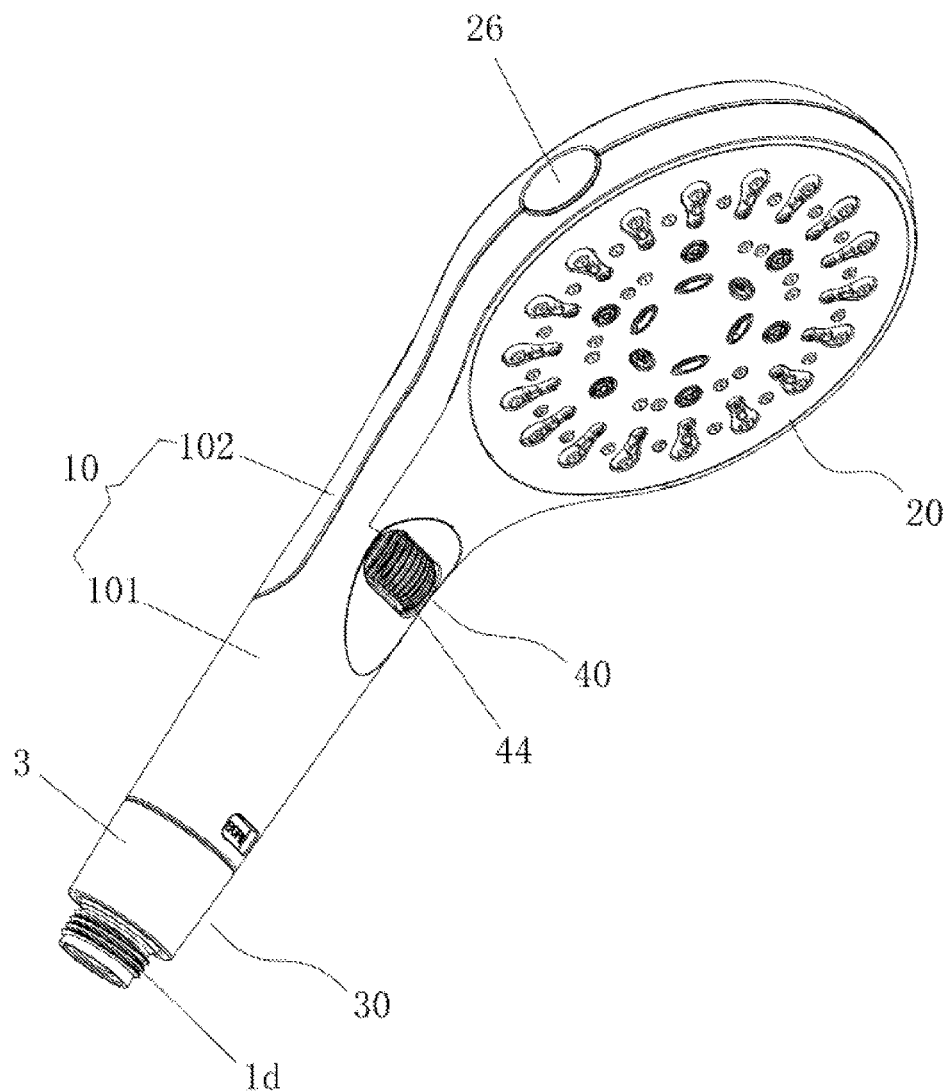
FIG. 8 is a three-dimensional view of a shower of the present invention.
Figure 9:
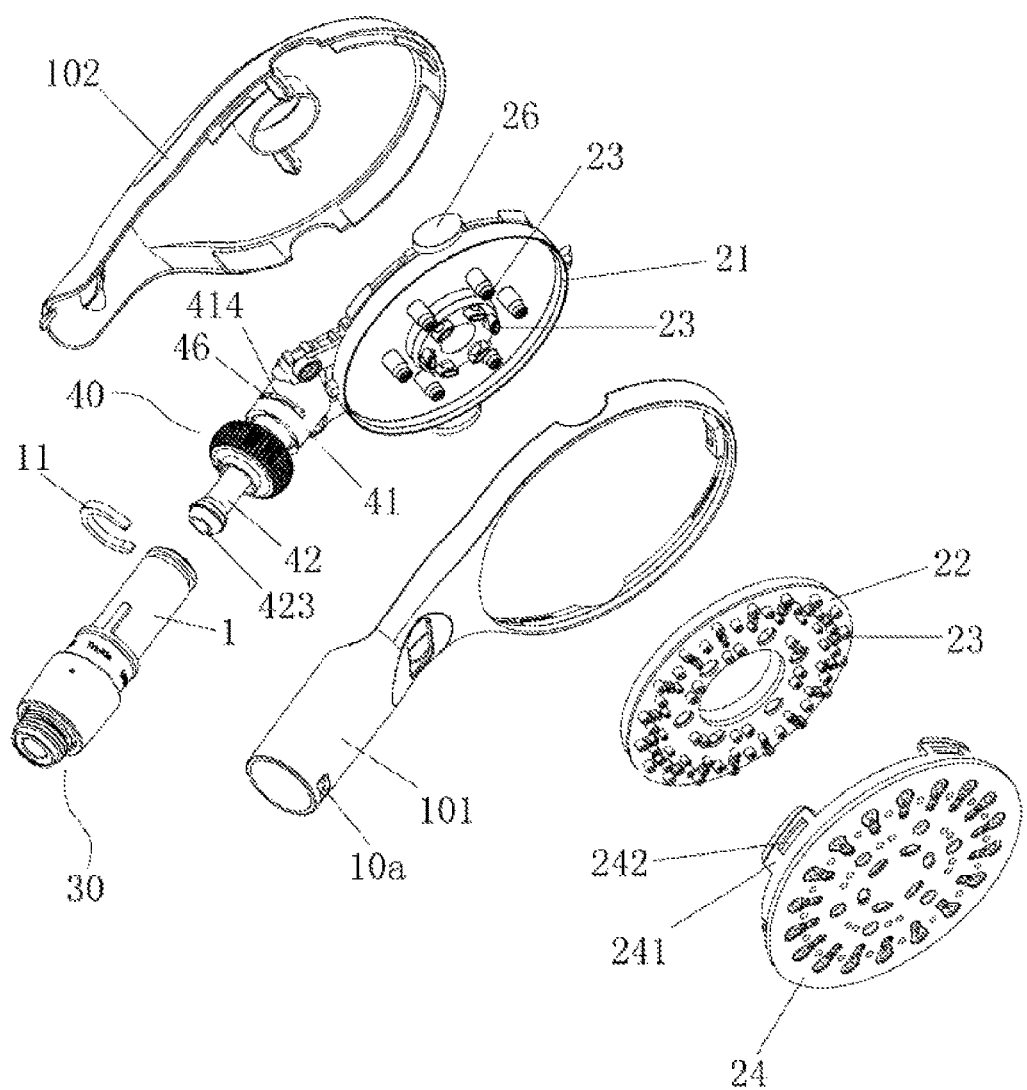
FIG. 9 is a three-dimensional front exploded view of the shower of the present invention.
Figure 10:
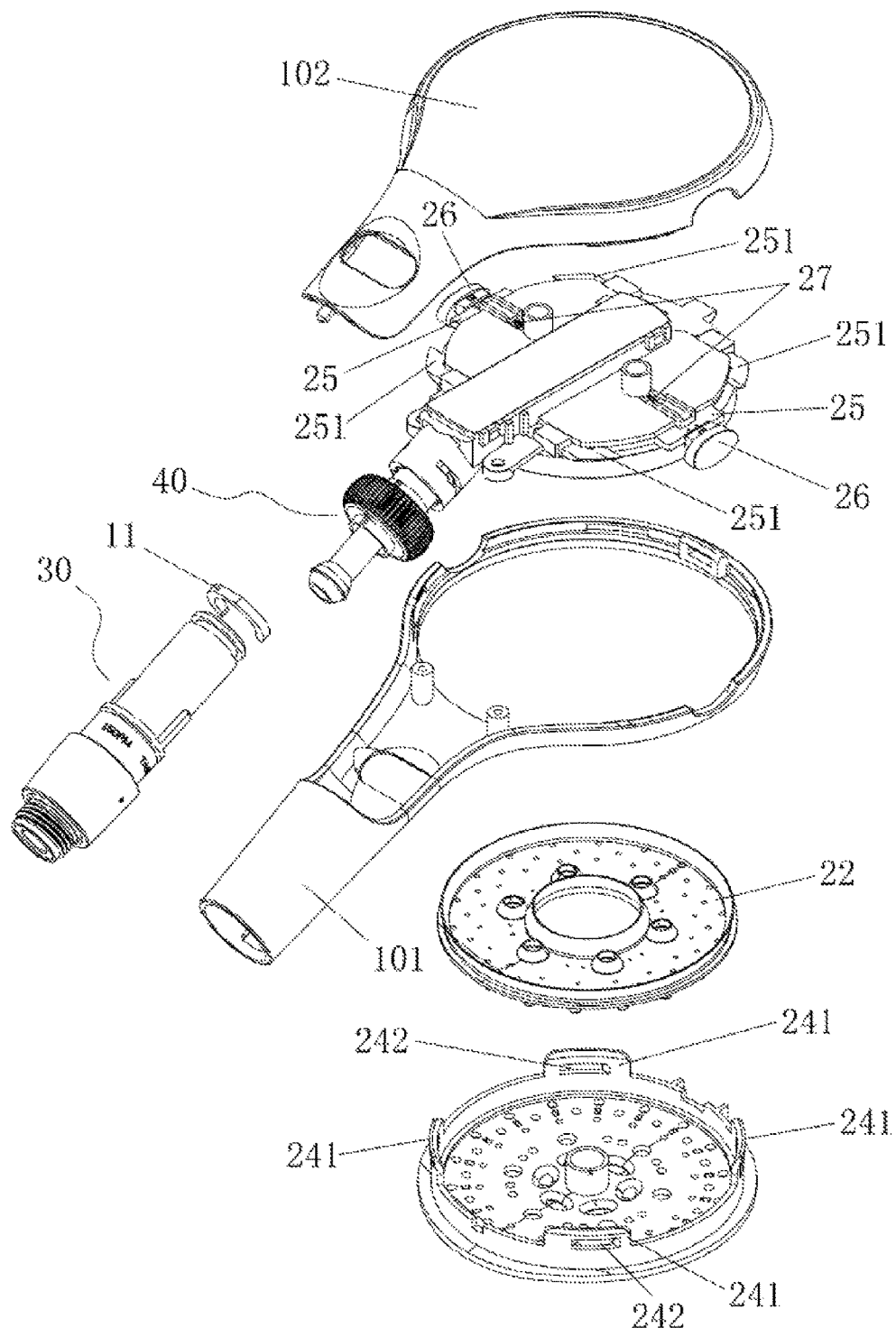
FIG. 10 is a three-dimensional rear exploded view of the shower of the present invention.
Figure 11:
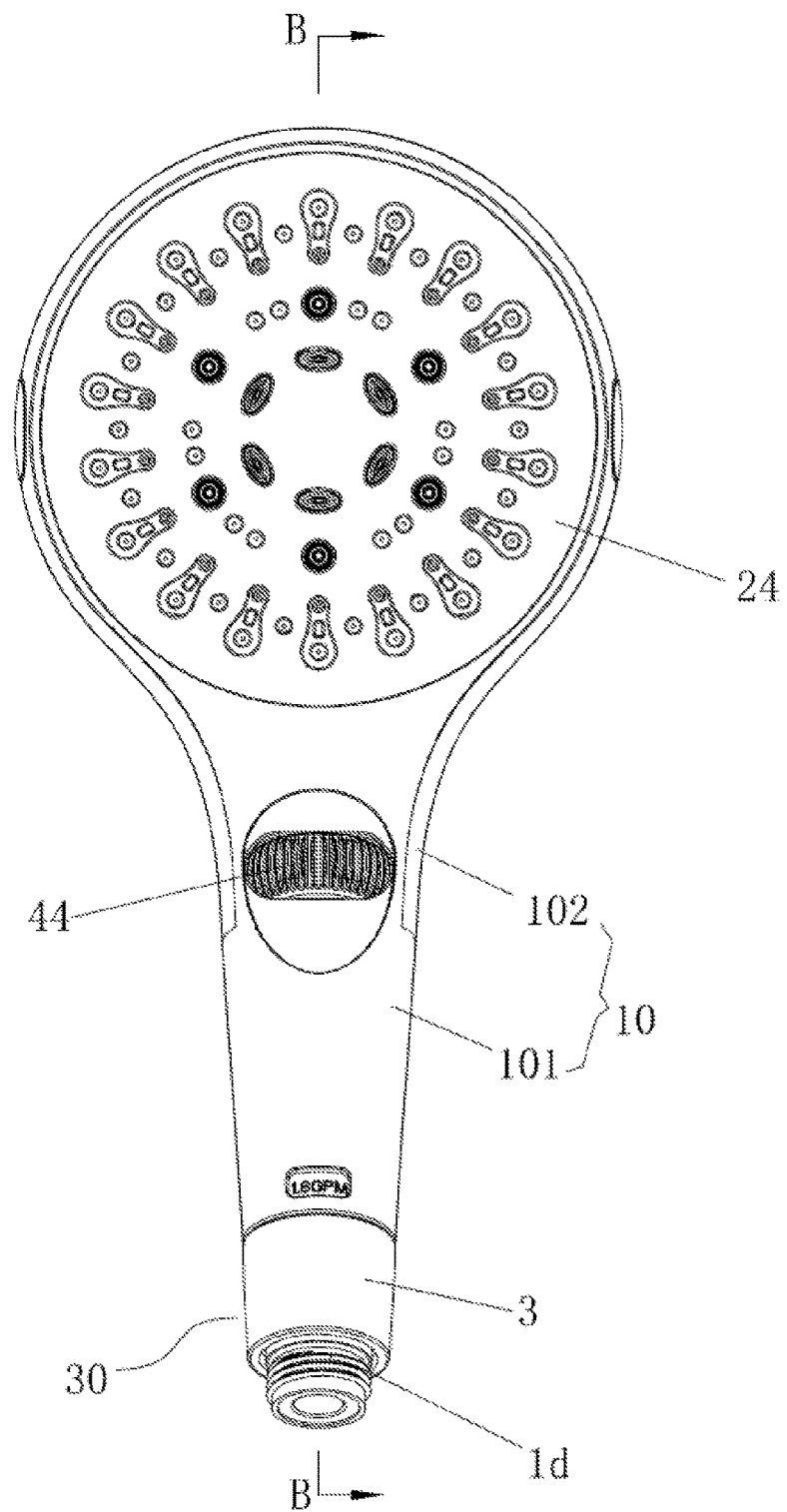
FIG. 11 is a front view of a shower of the present invention.
Figure 12:
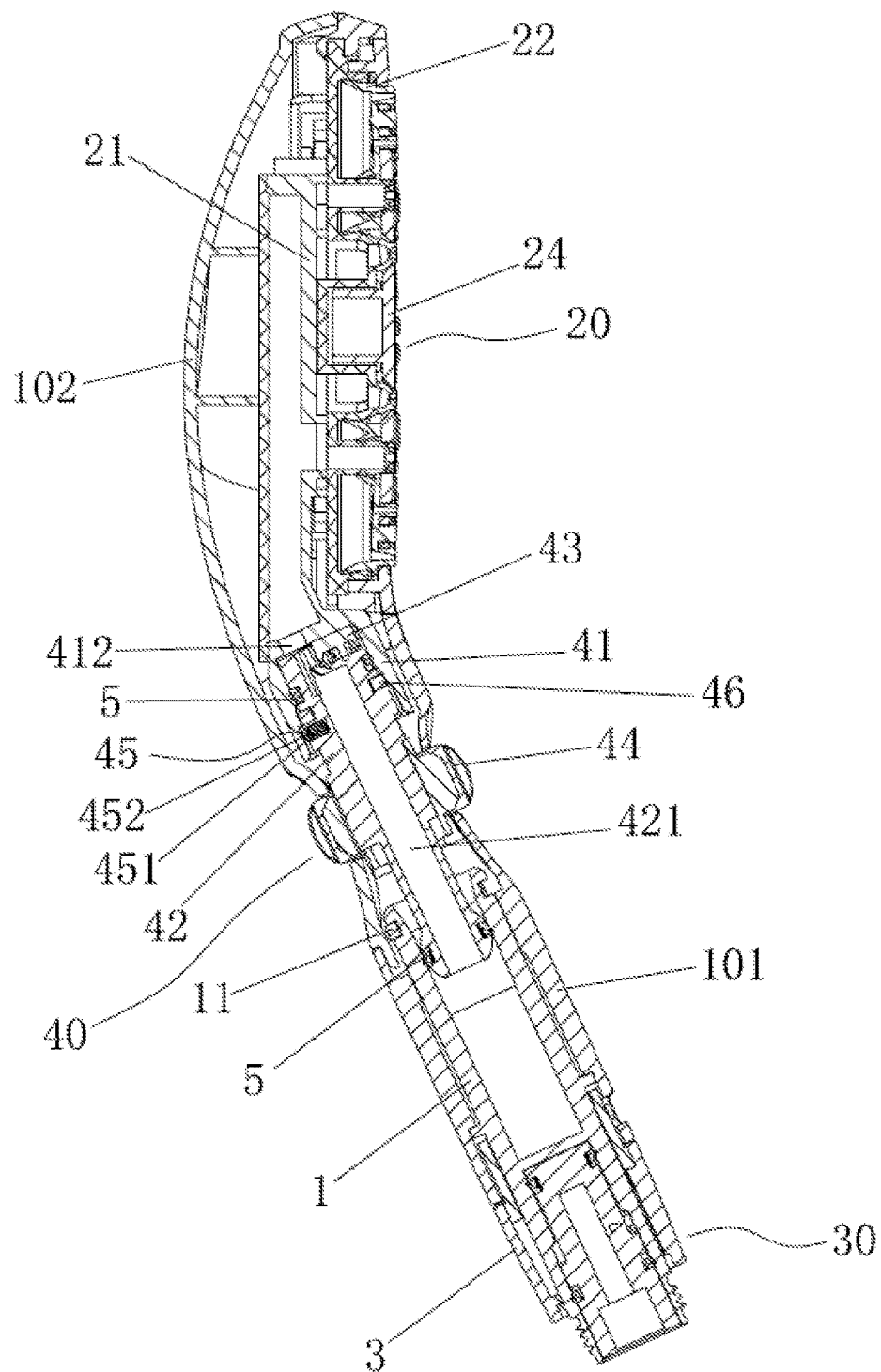
FIG. 12 is a B-B sectional view of FIG. 11.
Figure 13:
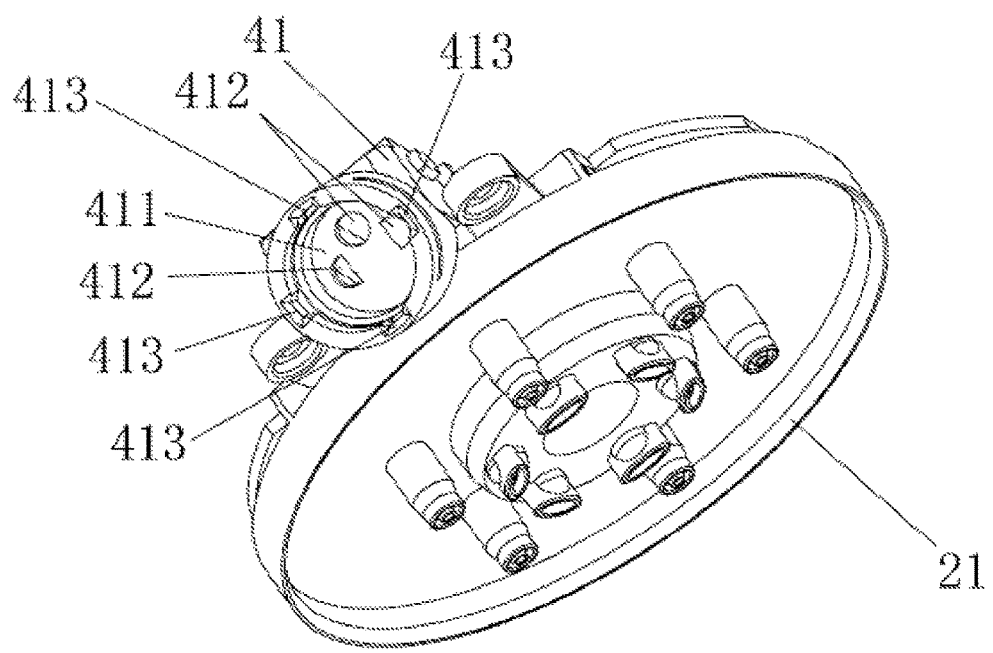
FIG. 13 is a three-dimensional view of an integral connection between a valve body and a water outlet base.
Figure 14:
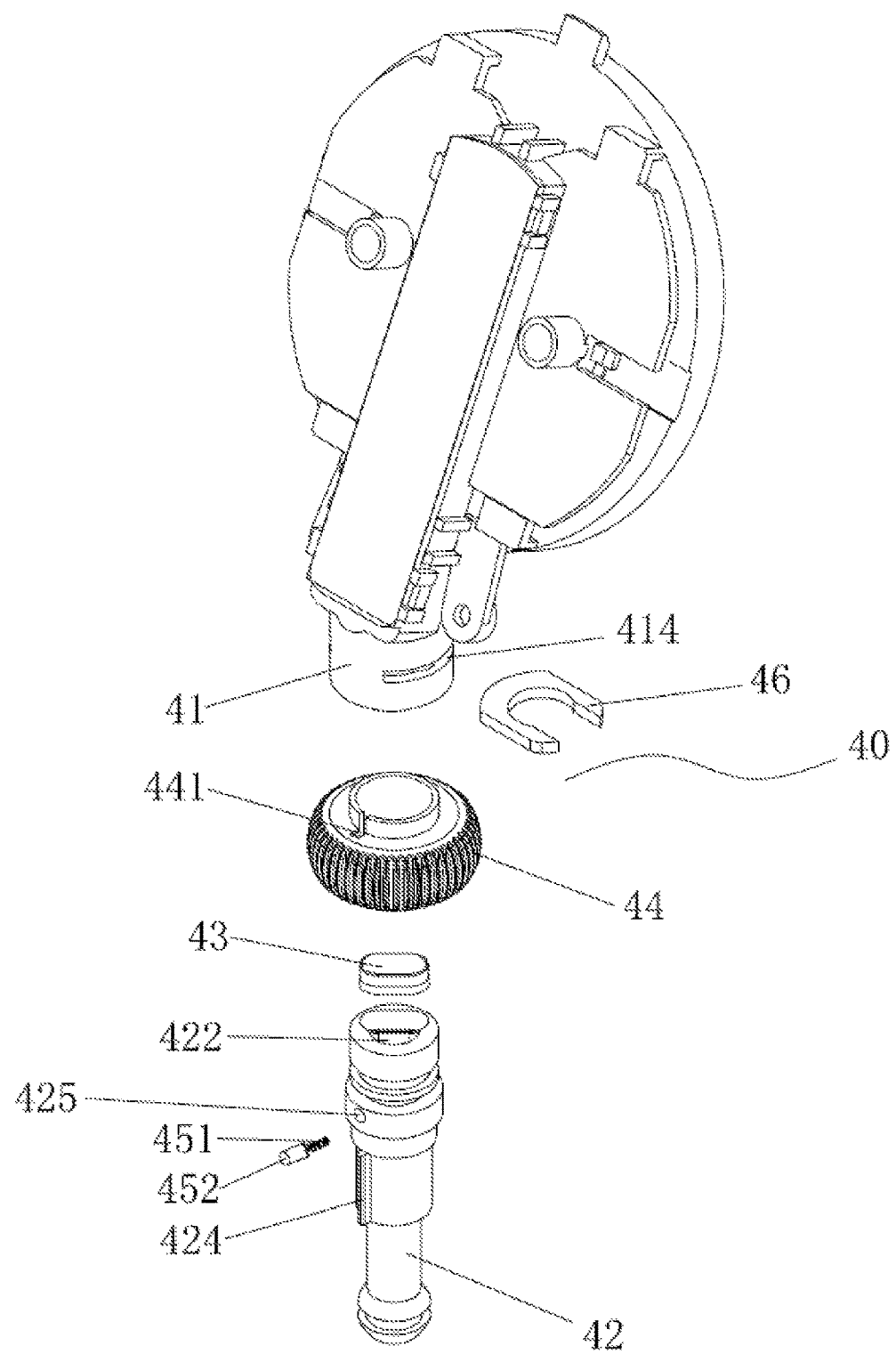
FIG. 14 is a three-dimensional exploded view of a water switching valve.

As shown in FIG. 8-FIG. 14, a shower includes a housing 10 with a hand-held portion; the housing 10 is equipped with a water outflow component 20 at one end; the water outflow component 20 is provided with three water outflow passages; the housing 10 is equipped with a flow control component 30, wherein the flow control component 30 is the flow control component as described in the above embodiment.

The water inlet pipe 1 of the flow control component 30 communicates with the water outflow passages on the water outflow component 20 through a water switching valve 40 which is installed on the housing 10.

The water switching valve 40 consists of a valve body 41 and a second rotating block 42; the valve body 41 has a cavity 411; three water discharge holes 412 are formed at the bottom of the cavity 411; each one of the water discharge holes 412 communicates with one of the water outflow passages on the water outflow component 20; one end of the second rotating block 42 is inserted in the cavity 411; the other end of the second rotating block 42 is inserted in the water inlet pipe 1 on the flow control component 30; a second water passage 421 is formed in the middle of the second rotating block 42; the end face of one end of the second rotating block 42 is embedded with a sealing plug 43 and formed with an eccentric water outlet 422; the end face of other end of the second rotating block 42 is formed with a water inlet 423; the water outlet 422 and the water inlet 423 communicate with each other through the second water passage 421; and the water outlet 422 communicates with the inner hole of the water inlet pipe 1.

A roller 44 is disposed at the middle portion of the second rotating block 42; the roller 44 is partly protruded out of the housing 10; by the matching between a key groove 441 of the roller 44 and a key 424 disposed on the second rotating block 42, the roller 44 and the second rotating block 42 form a fixed connection in the circumferential direction. Thus, the second rotating block 42 can be driven to rotate by toggling the roller 44. As the second rotating block 42 rotates, the water outlet 422 at one end of the second rotating block 42 selectively communicates with the water discharge holes 412 on the valve body 41 or avoids communication with all the water discharge holes 412 on the valve body 41, and the sealing plug 43 selectively seals the water discharge holes 412 on the valve body 41 or avoids sealing the water discharge holes 412 on the valve body 41. Thus, the water outflow component generates a plurality of water outflow states or does not discharge water.

A second positioning mechanism 45 is disposed between the second rotating block 42 and the valve body 41; the second positioning mechanism 45 consists of a second radial concave hole 425 which is disposed on the outer surface of the second rotating block 42, and a second pressure spring 451 and a second positioning column 452 which are installed in the second radial concave hole 425 in turn from the inside to the outside; four second positioning grooves 413 are formed on the inner surface of a groove of the valve body 41; and as the second rotating block 42 rotates, the second positioning column 452 can be respectively matched with different second positioning grooves 413.

One end of the water inlet pipe 1 close to the second rotating block 42 is clamped with a first U-shaped buckle 11; the water inlet pipe 1, together with the housing 10, forms axial positioning through the first U-shaped buckle 11; one end of the second rotating block 42 close to the valve body 41 is clamped with a second U-shaped buckle 46; the second rotating block 42, together with the valve body 41, forms axial positioning through the second U-shaped buckle 46; the valve body 41 is formed with two through-holes 414 which communicate with the cavity 411; the two through-holes 414 are matched with the second U-shaped buckle 46; one of the sealing rings 5 is disposed between the outside face of the second rotating block 42 and the inside face of the water inlet pipe 1, and the other sealing ring 5 is disposed between the outside face of the second rotating block 42 and the inside face of the cavity 411.

The water outflow component 20 includes a water outflow base 21 and a water outflow board 22 which are mutually connected; the three water outflow passages on the water outflow component 20 are disposed on the water outflow base 21; the water outflow base 21 is integrally connected with the valve body 41; the water outflow board 22 is formed with a group of blowholes 23; the water outflow base 21 is formed with two groups of blowholes 23; each group of the blowholes 23 correspond to one of the water outflow passages on the water outflow base 21; the three outflow passages on the water outflow base 21 respectively communicate with the three water discharge holes 412 on the valve body 41; and the water outflow board 22 is also sleeved with a surface cover 24.

The two sides of the surface cover 24 respectively extend backward to form two flanges 241; the flanges 241 are formed with plugging holes 242; two clamping boards 25 which can move toward each other are installed on the back of the water outflow base 21; each one of the clamping boards 25 is provided with two plugging protrusions 251; when the two clamping boards 25 move away from each other, each one of the plugging protrusions 251 is matched with one of the plugging holes 242; and when the two clamping boards 25 move toward each other, the plugging protrusions 251 separate from the plugging holes 242.

The housing 10 is equipped with a button 26 on each one of the two sides of one end where the water outflow component 20 is installed; a reset pressure spring 27 is installed between each one of the clamping boards 25 and the water outflow base 21; pressing the two buttons 26 drives the two clamping boards 25 to move toward each other; when the two buttons 26 are released, the two clamping boards 25 move away from each other by the effect of the two reset pressure springs 27; and two guide rails are disposed on the back of the water outflow base 21 to guide the two clamping boards 25 to move toward each other.

The housing 10 consists of a front housing 101 and a rear housing 102; the front housing 101 and the rear housing 102 are buckled together; the front housing 101 is provided with the display window 10a; and through the display window 10a, the water flow of the flow control component 30 can be observed.

When the shower in this embodiment is in use, an external water inlet pipe is connected through the connecting screw threads 1d of the water inlet pipe 1; the adjusting sleeve 3 on the flow control component 30 is rotated to select a proper water inflow; then, the roller 44 on the water switching valve 40 is toggled to drive the second rotating block 42 to rotate to select a water outflow state. Thus, the water outflow component 20 performs proper water spray.

The above embodiments are only used to further describe the present invention, but the present invention is not limited to the aforementioned embodiments. All equivalent changes made on the basis of the claims by those skilled in the art should fall within the protective scope of the present invention.

What is claimed is:

1. A flow control component, comprising a water inlet pipe, wherein a partition is disposed in the middle of the water inlet pipe; the partition is formed with a plurality of water holes which are different in aperture; a first rotating block is installed in an inner hole of the water inlet pipe; a first water passage is disposed in the middle of the first rotating block; the first rotating block is formed with a water diversion opening on an end face of a first end and a main water opening on an end face of a second end; the water diversion opening and the main water opening communicate with each other through the first water passage; the water diversion opening of the first rotating block is eccentrically disposed on the end face of the first end of the first rotating block; the water diversion opening of the first rotating block is disposed close to the partition; wherein the water inlet pipe is externally sleeved with an adjusting sleeve; a radial arc-shaped hole is formed on an outside face of the water inlet pipe; a toggle pin passes through the arc-shaped hole and has a first end connected with the first rotating block and a second end connected with the adjusting sleeve; the adjusting sleeve drives the first rotating block to rotate through the toggle pin between an open state and a closed state; wherein in the open state, the first rotating block communicates with one of the water holes and in the closed state, the first rotating block avoids communication with all the water holes.

2. The flow control component according to claim 1, wherein a toggle groove is formed on an inside face of the adjusting sleeve; a first end of the toggle pin is inserted in the first rotating block and a second end is clamped on the toggle groove; and at least one sealing ring is disposed between the first rotating block and an inside face of the water inlet pipe.

3. The flow control component according to claim 1, wherein a first positioning mechanism is also disposed between the water inlet pipe and the adjusting sleeve; the first positioning mechanism consists of a first radial concave hole which is formed on an outside face of the water inlet pipe, and a first pressure spring and a first positioning column which are installed in the first radial concave hole in turn from the inside to the outside; a plurality of first positioning grooves are formed on an inner circumferential face of the adjusting sleeve; and as the adjusting sleeve rotates, the first positioning column is respectively matched with different first positioning grooves.

4. The flow control component according to claim 1, wherein the water inlet pipe is also externally sleeved with a display ring and a housing; the display ring is provided with a plurality of indicating marks; the housing is provided with a display window; parts of the display ring with the indicating marks extend into the housing; and the adjusting sleeve is connected to the display ring; the adjusting sleeve drives the display ring to rotate; and the plurality of indicating marks can appear on the display window in turn.

5. A shower, comprising a housing with a hand-held portion, the housing equipped with a water outflow component at one end, the water outflow component provided with a plurality of water outflow passages, wherein the housing is equipped with the flow control component as described in claim 1, and the water inlet pipe of the flow control component communicates with the water outflow passages on the water outflow component through a water switching valve which is installed on the housing.

6. The shower according to claim 5, wherein the water switching valve consists of a valve body and a second rotating block; the valve body has a cavity; a plurality of water discharge holes are formed at the bottom of the cavity; each one of the water discharge holes communicates with one of the water outflow passages on the water outflow component;

wherein a first end of the second rotating block is inserted in the cavity; a second end of the second rotating block is inserted in the water inlet pipe on the flow control component; a second water passage is formed in the middle of the second rotating block; an end face of the first end of the second rotating block is embedded with a sealing plug and formed with an eccentric water outlet; an end face of the second end of the second rotating block is formed with a water inlet; the water outlet and the water inlet communicate with each other through the second water passage; the water outlet communicates with the inner hole of the water inlet pipe;

wherein a roller is disposed at the middle portion of the second rotating block; the roller is partly protruded out of the housing; the second rotating block is driven to rotate by toggling the roller; as the second rotating block rotates, the water outlet at the first end of the second rotating block selectively moves between an open state and a closed state, wherein in the open state, the water outlet communicates with one of the water discharge holes on the valve body, and in the closed state, avoids communication with all the water discharge holes on the valve body, and the sealing plug selectively moves between an open state and a closed state, wherein in the open state, the sealing plug seals the water discharge holes on the valve body, and in the closed state, avoids sealing the water discharge holes on the valve body.

7. The shower according to claim 5, wherein a second positioning mechanism is disposed between the second rotating block and the valve body; the second positioning mechanism consists of a second radial concave hole which is disposed on the outer surface of the second rotating block, and a second pressure spring and a second positioning column which are installed in the second radial concave hole in turn from the inside to the outside; a plurality of second positioning grooves are formed on the inner surface of a groove of the valve body; and as the second rotating block rotates, the second positioning column can be respectively matched with different second positioning grooves.

8. The shower according to claim 5, wherein one end of the water inlet pipe close to the second rotating block is clamped with a first U-shaped buckle; the water inlet pipe, together with the housing, forms axial positioning through the first U-shaped buckle; one end of the second rotating block close to the valve body is clamped with a second U-shaped buckle; the second rotating block, together with the valve body, forms axial positioning through the second U-shaped buckle; a sealing ring is disposed between the outside face of the second rotating block and the inside face of the water inlet pipe, and a sealing ring is also disposed between the outside face of the second rotating block and the inside face of the cavity.

9. The shower according to claim 5, wherein the water outflow component includes a water outflow base and a water outflow board which are mutually connected; the plurality of water outflow passages on the water outflow component are disposed on the water outflow base; the water outflow base is integrally connected with the valve body; the water outflow board is correspondingly formed with groups of blowholes; the water outflow board and the water outflow base are correspondingly formed with groups of blowholes; each group of the blowholes correspond to one of the water outflow passages on the water outflow base; the plurality of outflow passages on the water outflow base respectively communicate with the plurality of water discharge holes on the valve body; and the water outflow board is also sleeved with a surface cover.

10. The shower according to claim 9, wherein two sides of the surface cover respectively extend backward to form at least one flange; the at least one flange is formed with plugging holes; two clamping boards which can move toward each other are installed on the back of the water outflow base; each one of the clamping boards is provided with plugging protrusions; when the two clamping boards move away from each other, each one of the plugging protrusions is matched with one of the plugging holes; when the two clamping boards move toward each other, the plugging protrusions separate from the plugging holes;

wherein the housing is equipped with a button on each one of the two sides of one end where the water outflow component is installed; a reset pressure spring is installed between each one of the clamping boards and the water outflow base; pressing the two buttons drives the two clamping boards to move toward each other; when the two buttons are released, the two clamping boards move away from each other by the effect of the two reset pressure springs; and two guide rails are disposed on the back of the water outflow base to guide the two clamping boards to move toward each other.

* * * * *